United States Patent
Yoshihara

(10) Patent No.: US 7,729,486 B2
(45) Date of Patent: Jun. 1, 2010

(54) PRIVATE BRANCH EXCHANGE AND TELEPHONE SWITCHING SYSTEM

(75) Inventor: Atsushi Yoshihara, Hino (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1114 days.

(21) Appl. No.: 11/375,879

(22) Filed: Mar. 14, 2006

(65) Prior Publication Data

US 2006/0222159 A1 Oct. 5, 2006

(30) Foreign Application Priority Data

Mar. 30, 2005 (JP) ............................. 2005-099288

(51) Int. Cl.
- H04M 1/56 (2006.01)
- H04M 15/06 (2006.01)
- H04M 1/00 (2006.01)
- H04M 3/00 (2006.01)

(52) U.S. Cl. .................. 379/164; 379/142.17; 379/156; 379/198

(58) Field of Classification Search ............ 379/142.01, 379/142.04, 142.07, 142.12, 142.17, 156–157, 379/164–166, 199–198, 231, 245
See application file for complete search history.

(56) References Cited

U.S. PATENT DOCUMENTS

| 6,169,738 B1* | 1/2001 | Sriram et al. .......... 370/395.21 |
| 6,952,468 B2* | 10/2005 | Lee ........................ 379/142.12 |
| 7,248,679 B2* | 7/2007 | Choi ........................... 379/157 |
| 2001/0028708 A1* | 10/2001 | Tanaka et al. ................ 379/156 |

FOREIGN PATENT DOCUMENTS

| JP | 10-174134 | 6/1998 |
| JP | 11-068923 | 3/1999 |
| JP | 11-187434 | 7/1999 |

* cited by examiner

*Primary Examiner*—Binh K Tieu
(74) *Attorney, Agent, or Firm*—Blakely, Sokoloff, Taylor & Zafman LLP

(57) ABSTRACT

According to one embodiment, a private branch exchange includes a receiver which receives caller ID information divided into a plurality of packets, the caller ID information specifying a caller side telephone set, when receiving an incoming call, a measurement unit which measures an elapsed time after the receiver has received the packets, a reset unit which resets the elapsed time measured by the measurement unit when the receiver receives the packets, and a transmitter which transmits the packets received by the receiver to a private telephone set on an incoming call side, as caller ID information, when the elapsed time measured by the measurement unit exceeds a specified time.

8 Claims, 3 Drawing Sheets

PRIVATE BRANCH EXCHANGE AND TELEPHONE SWITCHING SYSTEM

CROSS-REFERENCE TO RELATED APPLICATIONS

This application is based upon and claims the benefit of priority from Japanese Patent Application No. 2005-099288, filed Mar. 30, 2005, the entire contents of which are incorporated herein by reference.

BACKGROUND

1. Field

One embodiment of the invention relates to a private branch exchange (hereinafter referred to as PBX) and a telephone switching system.

2. Description of the Related Art

Conventionally, a PBX capable of displaying caller ID information such as a caller telephone number onto a display of a private telephone set housed in the PBX has been proposed.

It is disclosed by, for example, Japanese Patent Application Publication KOKAI No. H10-174134.

This PBX receives caller ID information indicating a caller telephone number on a public switched telephone network (PSTN) side to a PBX on an incoming call side, then, displays the caller ID information onto a display of the PBX on the incoming call side.

In caller ID information is usually communicated in a packet form in which the caller ID information is divided into some items thereof and can be included a caller name, a calling date and time, a caller telephone number non notice reason, caller telephone number expansion information, etc., other than the caller telephone number.

Such a PBX to treat the caller ID information generally determines whether or not it has received whole items of the caller ID information from a PSTN depending on the fact whether or not a specified time has already elapsed from a start of a reception of the caller ID information. That is, the PBX transmits the caller ID information to a telephone set on the incoming call side after a specified time from a reception of a packet of the first caller ID information. However, as mentioned above, since it is possible for the caller ID information to include a variety of items of information other than the caller telephone number, a data quantity becomes large sometime. Therefore, the PBX has to set the specified time being a threshold longer and the transmission of the caller ID information to the telephone set on the incoming call side delays even when the caller ID information is small in quantity. In contrast, if the threshold is set smaller, the caller ID information having a large data quantity cannot be received up to its end.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings, In general, according to one embodiment of the invention, a private branch exchange connected to a public switched telephone network to a plurality of private telephone sets, comprising: a receiver which receives caller ID information divided into a plurality of packets, the caller ID information specifying a caller side telephone set, when receiving an incoming call; a measurement unit which measures an elapsed time after the receiver has received the packets; a reset unit which resets the elapsed time measured by the measurement unit when the receiver receives the packets; and a transmitter which transmits the packets received by the receiver to a private telephone set on an incoming call side, as caller ID information, when the elapsed time measured by the measurement unit exceeds a specified time.

Figure 1:
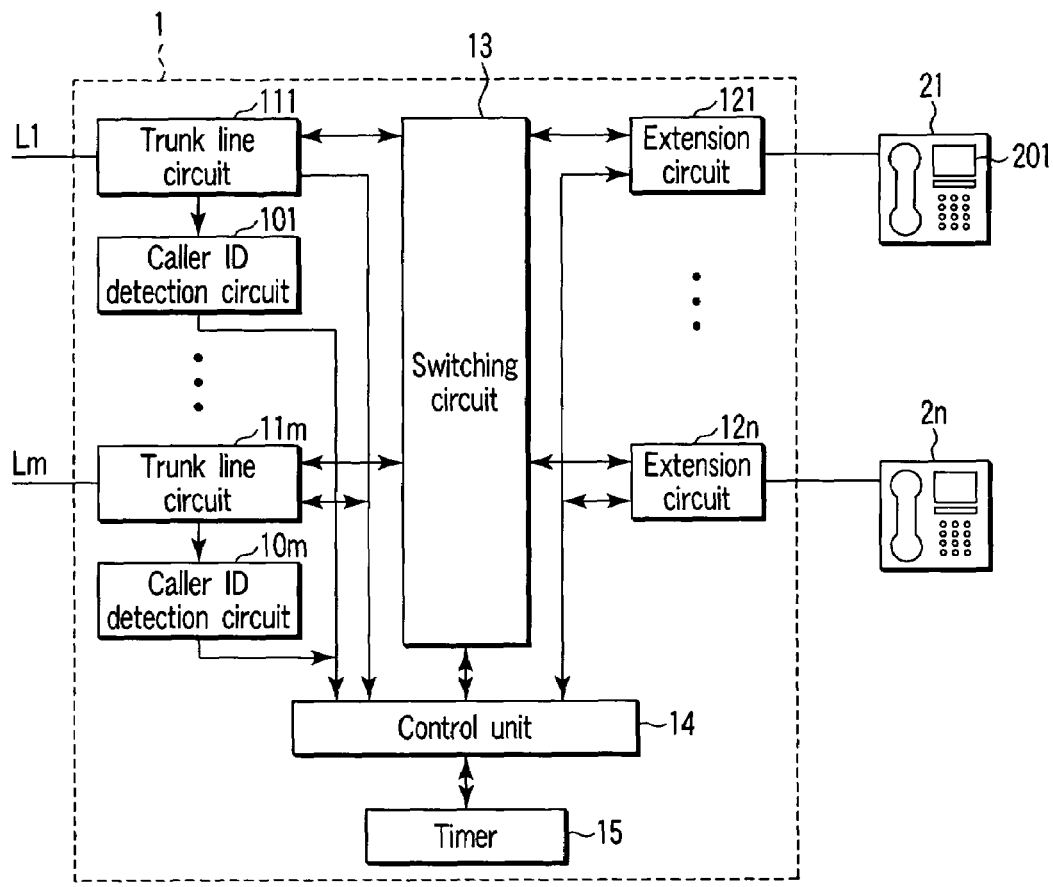
FIG. 1 is an exemplary block diagram showing a configuration of a telephone switching system and a PBX according to a embodiment of the present invention.

FIG. 1 is a block diagram showing a configuration of a PBX and a telephone switching system of the present invention. The telephone switching system comprises a PBX 1 connected to trunk lines L1-Lm from a PSTN and private telephone sets 21-2n to be housed in the PBX 1.

The PBX 1 includes trunk line circuits 111-11m (reception means) connected to trunk lines L1-Lm, respectively; caller ID detection circuits 101-10m connected to the trunk line circuits 111-11m, respectively, to detect caller ID information for detecting caller ID information from the PSTN; and extension circuits 121-12n (a first receiver and a transmitter) connected to the private telephone sets 21-2n, respectively, to perform connection processing among extensions and outside lines.

Further, the PBX 1 comprises a switching circuit 13 to switch connection paths among the trunk line circuits 111-11m and the extension circuits 121-12n; a control unit 14 to control the whole of the PBX 1; and a timer 12 (a measurement unit) to measure an elapsed time after newly receiving a caller ID packet.

The trunk line circuits 111-11m are connected to the trunk lines L1-Ln, respectively, as mentioned above, to perform incoming calls to the private telephone sets 21-2n from the PSTN and outgoing calls to the PSTN from the private telephone sets 21-2n. When the incoming calls arrive to the private telephone sets 21-2n, the trunk line circuits 111-11m receive caller ID information in relation to telephone numbers, etc., of caller telephone sets.

The caller ID detection circuits 101-10m are connected to the trunk line circuits 111-11m, respectively, and when the incoming calls arrive therefrom, it detects the caller ID information relating to the caller side telephone sets. At this moment, the caller ID information is transmitted from the caller side telephone sets, as caller ID packet in which the caller ID information is divided into some items.

The control unit 14 consists of a CPU and a memory to control each constituent component composing the PBX 1. The control unit 14 connects the timer 15 and can acquire, form the timer 15, the elapsed time after newly receiving the caller ID packet.

The extension circuits 121-12n perform incoming calls, outgoing calls, telephone calls, etc., among the trunk line circuits 111-11m and the extensions 121-12n by being switched the connection paths by the switching circuit 13 and also transmit the caller ID information of the caller side telephone sets to the private telephone sets to receive the incoming calls under the control by the control unit 14. The private telephone sets 21-2n have LCDs 201, respectively, to enable them to display the caller telephone numbers, calling times, caller names and the like being the caller ID information.

Figure 2:
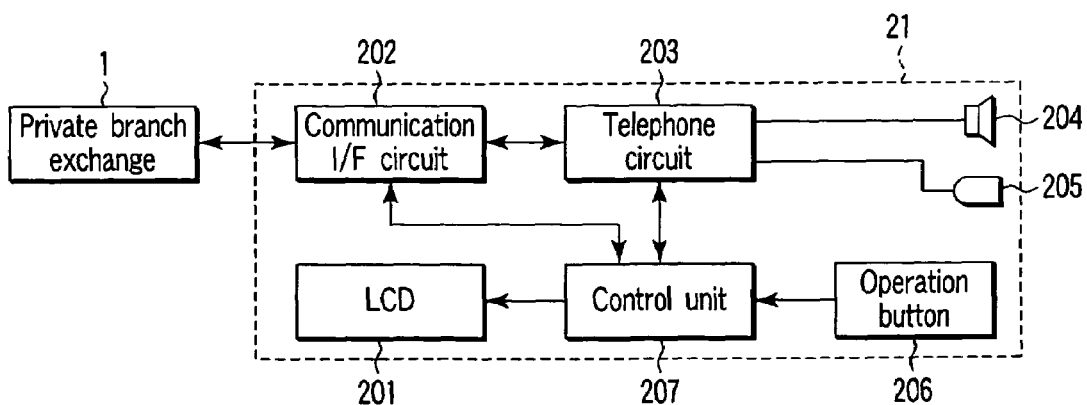
FIG. 2 is an exemplary view showing a configuration of the PBX regarding the embodiment.

FIG. 2 is a view showing a configuration of the private telephone set 21. The private telephone set 21 comprises a communication interface circuit 202 (a second receiver) to conduct interface processing to the caller ID information, communication signals, etc., to the PBX 1; a telephone circuit 203 to perform amplification and side-tone processing of transmission signals and reception signals; a loud speaker 204 consisting a handset; a microphone 205; an LCD 201 (a display) to display the caller ID information; operation button 206 to perform on/off hook in outgoing calls and incoming calls, an input operation of a telephone number, or the like; and a control unit 207 to control the whole of the private telephone set 21. A private telephone set 2n is also composed similarly.

The control unit 207 consists of a CPU and a memory to control each constituent component composing the private telephone set 21. The control unit 207 has a function of analyzing the caller ID information received from the interface circuit 202 and displaying the caller ID information such as the caller side telephone number and caller name onto the LCD 201.

Next to this, a flow of processing in which the caller ID information of the caller side telephone set is displayed on the LCD 201 of the private telephone set 21 after the PBX 1 receives the incoming call will be explained by referring to FIG. 3-FIG. 6. In the following explanation, the incoming call from the trunk line L1 to the private telephone set 201 will be explained as an example.

Figure 3:
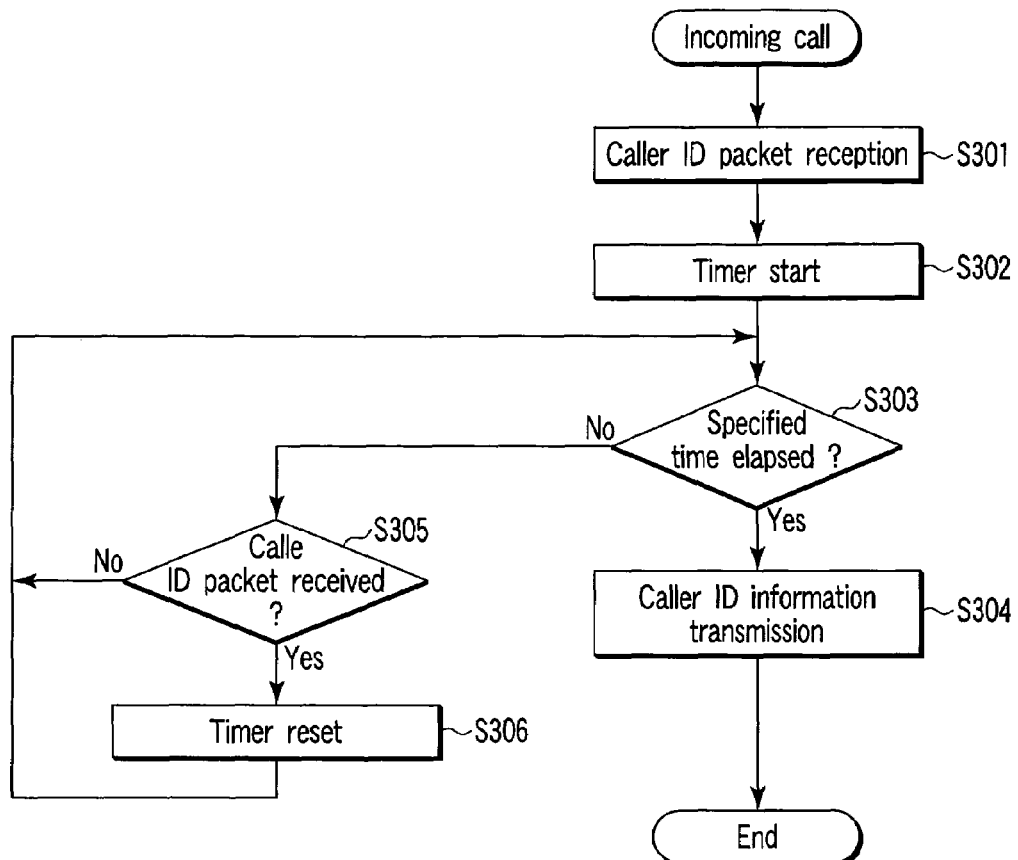
FIG. 3 is an exemplary flowchart showing a flow of processing of the PBX for displaying caller ID information onto a liquid crystal display (hereinafter referred to as LCD) of a private telephone set regarding the embodiment.

FIG. 3 is a flowchart showing a flow of the control unit 14 of the PBX 1 for displaying the caller ID information onto the LCD 201 of the private telephone set 21. The control unit 14 receives the incoming call from the trunk line L1 through the trunk line circuit 111, and when the caller ID packet is detected by the caller ID detection circuit 101 (block S301), the control unit 14 starts the timer 15 (block S302). The control unit 14 determines whether or not the specified time has elapsed from the reception of the caller ID packet (block S303), and if the specified time has elapsed from the reception of the caller ID packet (Yes, in block S303), the control unit 14 transmits the caller ID information from the extension circuit 121 to the private telephone set 21 (block S304).

If the specified time has not elapsed from the reception of the caller ID packet (No, in block S303), the control unit 14 determines whether or not the caller ID detection circuit 101 detects the fact that the trunk line circuit 111 detected that the caller ID packet was newly received (block S305). If the trunk line circuit 111 has newly received the caller ID packet (Yes, in block S305), the control unit 14 resets the timer 15 (block S306) to return to the block S303. If the trunk line circuit 111 has newly received the caller ID packet, the control unit 14 returns to the block S303 without resetting the timer 15.

Figure 4:
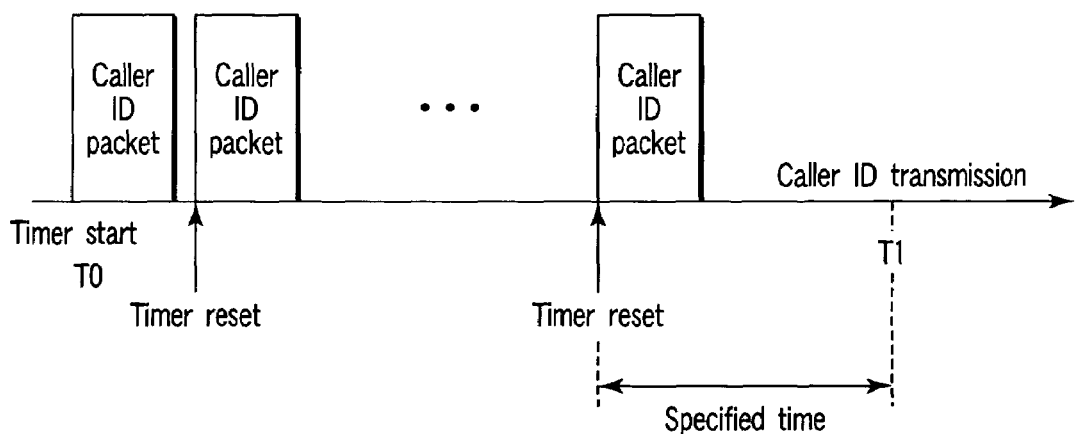
FIG. 4 is an exemplary time chart in relation to the processing in FIG. 3.

FIG. 4 is a view showing a time chart for transmitting the Caller ID information through the processing described in FIG. 3. At a time T0, the control unit 14 receives the caller ID packet from the trunk line circuit 111 to start the timer 15. After this, the control unit 14 resets the timer 15 at every time when a caller ID packet is newly received. When the specified time (T1) has elapsed from the latest reception of the caller ID packet, the control unit 14 determines that the reception of the caller ID information has already completed and transmits the caller ID information from the extension circuit 121 to the private telephone set 21.

Figure 5:
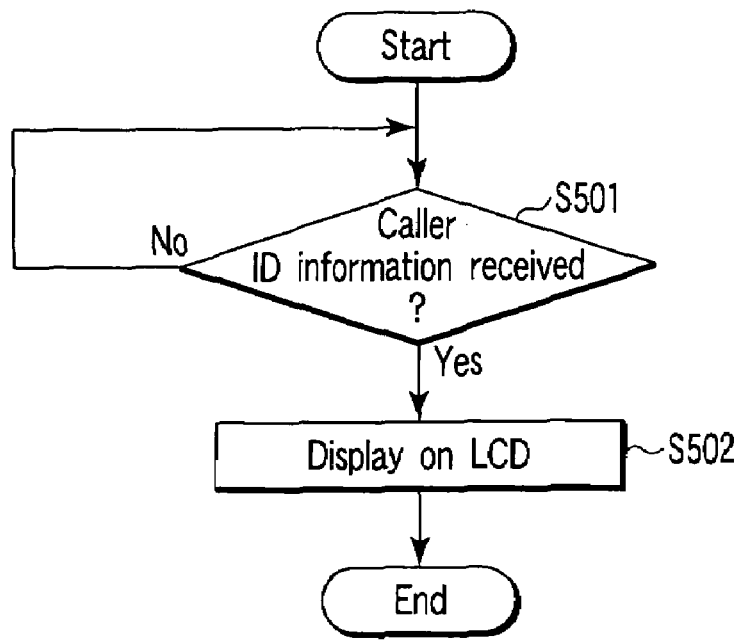
FIG. 5 is an exemplary flowchart showing a flow of processing of a private telephone set for displaying caller ID information onto an LCD of the private telephone set of the telephone switching system regarding the embodiment.

FIG. 5 is a flowchart showing a flow of processing of the private telephone set 21 for displaying the caller ID information onto the LCD 201 of the private telephone set 21. The control unit 207 determines whether or not the caller ID information is received from the PBX 1 through the interface circuit 202 (block S501). The telephone set 21 waits the reception of the caller ID information (block S501) if the caller ID information has not been received (No, in block S501). The telephone set 21 displays the concerned caller ID information onto the LCD 201 if the caller ID information has been received (block S502).

Figure 6:
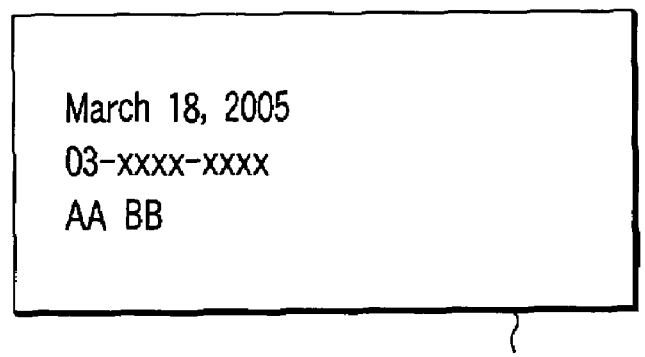
FIG. 6 is an exemplary view showing an example of caller ID information displayed on the LCD of the private telephone set of the telephone switching system regarding the embodiment.

FIG. 6 is an example when the control unit 207 displays the caller ID information onto the LCD 201. The example in FIG. 6 displays a calling date (Mar. 18, 2005), a telephone number of a caller telephone set (03-xxxx-xxxx) and a caller name (AA BB) on the LCD 201.

As mentioned above, the PBX 1 resets the timer 15 at every time when it newly receives the caller ID packet and transmits the caller ID information to the private telephone set 21 when the timer 15 measures the elapsed time not shorter than the specified time. Thereby, if the beginning data quantity of the caller ID information is small, the PBX 1 can transmit the caller ID information to the private telephone set 21 further quickly and display the caller ID information onto the LCD 201 further quickly.

According to the embodiment, not only the caller telephone number but the information on the calling data, the caller name and the like can be displayed from the caller ID information onto the LCD 201.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A private branch exchange connected to a public switched telephone network to a plurality of private telephone sets, comprising:
   a receiver which receives caller ID information divided into a plurality of packets, the caller ID information specifying a caller side telephone set, when receiving an incoming call;
   a measurement unit which measures an elapsed time after the receiver has received the packets;
   a reset unit which resets the elapsed time measured by the measurement unit when the receiver receives the packets; and a transmitter which transmits the packets received by the receiver to a private telephone set on an incoming call side, as caller ID information, when the elapsed time measured by the measurement unit exceeds a specified time.

2. The private branch exchange according to claim 1, wherein the receiver receives the caller ID information when receiving the incoming call from the public switched telephone network.

3. The private branch exchange according to claim 1, wherein the caller ID information includes information showing a telephone number of the caller side telephone set.

4. The private branch exchange according to claim 1, wherein the caller ID information includes the telephone number, date information and caller name information of the caller side telephone set.

5. A telephone switching system, comprising:

a private branch exchange connected to a public switched telephone network; and a plurality of private telephone sets housed in the private branch exchange, wherein the private branch exchange includes:

a first receiver which receives caller ID information divided into a plurality of packets, the caller ID information specifying a caller side telephone set, when receiving an incoming call;

a measurement unit which measures elapsed time after the first receiver receives the packets;

a reset unit which resets the elapsed time measured by the elapsed time when the first receiver receives the packets; and a transmitter which transmits the packets received by the first receiver to a private telephone set on an incoming call side, as caller ID information, when the elapsed time measured by the measurement unit exceeds a specified time; and wherein the private telephone set includes:

a second receiver which receives the caller ID information of the caller side telephone set when receiving the incoming call from the private branch exchange; and a display which displays contents of the caller ID information received from the second receiver.

6. The private branch exchange according to claim 5, wherein the first receiver receives the caller ID information when receiving the incoming call from the public switched telephone network.

7. The telephone switching system according to claim 5, wherein the display displays the telephone number of the caller side telephone set based on the caller ID information.

8. The telephone switching system according to claim 5, wherein the display displays the telephone number, a calling data and a caller name of the caller side telephone set based on the caller ID information.

* * * * *